Dec. 25, 1945.  S. PANTAGES  2,391,590
THREAD AND STRANDED WIRE GAUGE
Filed May 1, 1944    2 Sheets-Sheet 1
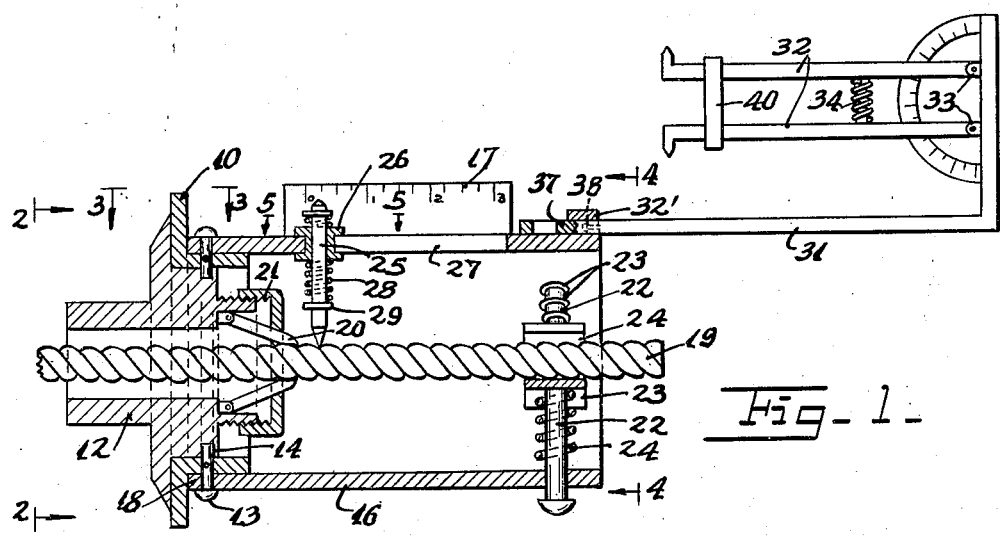
Fig-1-
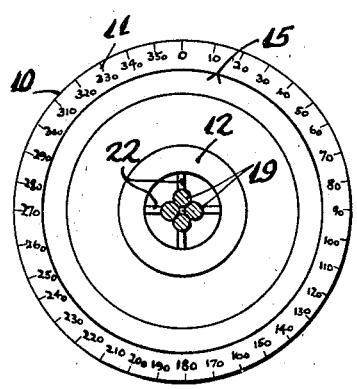
Fig-2-
Fig-3-
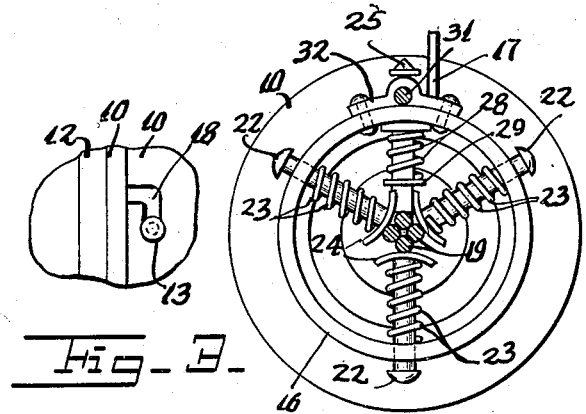
Fig-4-
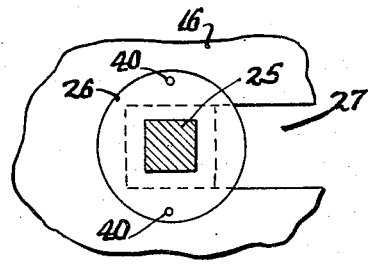
Fig-5-
INVENTOR.
Steven Pantages
BY
Zoltan H Polachek
ATTORNEY Dec. 25, 1945. S. PANTAGES 2,391,590
THREAD AND STRANDED WIRE GAUGE
Filed May 1, 1944 2 Sheets-Sheet 2
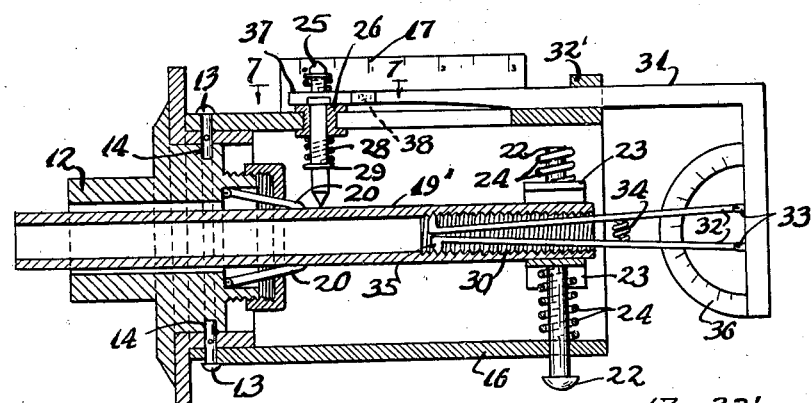
Fig-6-
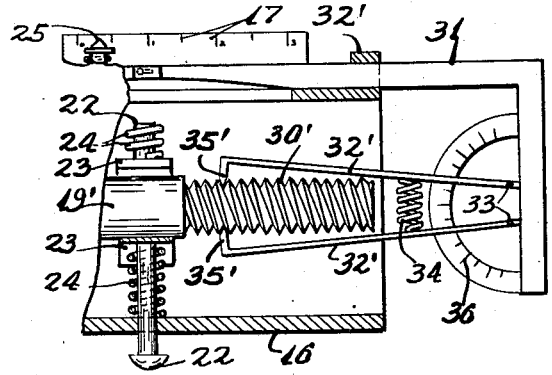
Fig-8-
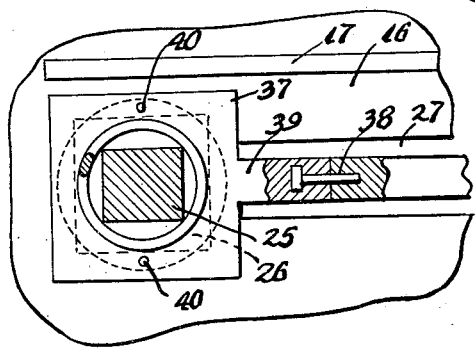
Fig-7-
INVENTOR.
Steven Pantages
BY
ATTORNEY Patented Dec. 25, 1945

2,391,590

UNITED STATES PATENT OFFICE 2,391,590

THREAD AND STRANDED WIRE GAUGE

Steven Pantages, New York, N. Y.

Application May 1, 1944, Serial No. 533,457

2 Claims. (Cl. 33—199)

This invention relates to new and useful improvements in a thread and stranded wire gauge.

More specifically the invention proposes the construction of a thread gauge which has as its purpose to provide a simple device for measuring the twist of "lay" of stranded wire.

One of the main problems of cable and wire manufacturers is the maintenance of proper dimensions of stranded conductors. Mechanical strength, tensile strength, flexibility, accurate size as well as electrical properties such as corona effect, skin effect, especially for high frequency cables, impedance and current distribution depends on the twist as well as the geometrical shape of the stranded conductors. It is important therefore to know the twist or "lay" of the inner conductor inasmuch as it affects the electrical as well as the mechanical characteristics of the cable or wire. It is the purpose of this invention to provide a simple device to determine the number of turns per unit length.

A further object of the invention provides the construction of a device, which is not limited in its use to determining the twist of stranded wire, but which may also be used for determining the pitch of all types of standard screw threads either externally or internally, permitting a complementary thread to be provided on a complementary object to be used in connection with the object whose thread pitch is being measured.

A further object of the invention proposes forming the thread gauge with a collar having an angular scale and which rotatively supports a tubular knob which is cooperative with the scale, and which is provided with a means for gripping a tubular object in a manner to permit it to be turned by rotating the knob relative to the collar.

A further object of the invention proposes the provision of a tube provided with a linear scale and which slidably supports a follower which is adapted to move longitudinally of the tube and which is arranged to engage the external threads of a screw or the twist of a wire in a manner to move the follower longitudinally as the knob of the collar is turned to determine when the follower has moved a given distance over the surface of the object being measured.

It is a further object of the invention to construct a thread gauge which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a longitudinal scale view of a thread gauge constructed in accordance with this invention.

Fig. 2 is an end longitudinal view looking in the direction of the line 2—2 of Fig. 1.

Fig. 3 is a partial plan view looking in the direction of line 3—3 of Fig. 1.

Fig. 4 is an end elevational view looking in the direction of the line 4—4 of Fig. 1.

Fig. 5 is a horizontal sectional view taken on the line 5—5 of Fig. 1.

Fig. 6 is a view similar to Fig. 1, but illustrating the device set up to measure internal threads.

Fig. 7 is a horizontal section view taken on the line 7—7 of Fig. 6.

Fig. 8 is a fragmentary view similar to Fig. 6, showing another application of the device.

The thread gauge according to this invention comprises a collar 10 which is provided on its face with an angular scale 11. A tubular knob 12 is axially rotatively mounted in the collar 10. The rotative connection between the collar 10 and the knob 12 is accomplished by oppositely disposed pins 13 which are mounted upon the collar 10, and which have their inner ends engaging peripheral grooves 14 formed on the knob 12. The engagement of the pins 13 with the grooves 14 permits the knob 12 to be freely rotated in either direction relative to the collar 11. One side of the knob 12 is provided with a pointer 15 which operates over the angular scale 11 formed on the collar 10 for indicating a complete revolution of the knob relative to the collar 10 or the distance the knob 12 has been turned relative to the collar 10 when this distance is an amount less than a complete revolution.

A tube 16 is mounted upon the collar 10, and is provided with a linear scale 17. The end of the tube 16 which engages the collar 10 is provided with bayonet slots 18 which are adapted to be engaged with the projected ends of the pins 13 in a manner to retain the tube 16 removably upon the collar 10.

A means is provided upon the inner end of the knob 12 for supporting a helically grooved member extended axially through the tube 16. In this first embodiment of the invention the helically grooved member is characterized by a length of wire 19 which is twisted. The gripping means on the knob 12 is characterized by several pivotally mounted levers 20 which are adapted to be engaged against the sides of the helically grooved member 19 by means of a ring 21 when it is threadedly engaged upon a portion of the knob 12. Tightening the ring 21 at the end of the knob 12 will cause the levers 20 to be directed towards each other and rigidly grip the helically grooved member 19.

A means is provided on the opposite end of the tube 16 for assisting the grip means in maintaining the helically grooved member 19 in its axial position through the tube 16. This means comprises slidably mounted pins 22 on the tube 16 which are provided at their inner ends with shoes 24 adapted to engage the sides of the helically grooved member 19. Expansion springs 23 operate between the inner face of the tube 16 and the shoes 23 urging the pins 22 into a position in which the shoes 23 will seat themselves upon the sides of the helically grooved member 19.

A follower is arranged in connection with the linear scale 17 for assisting the angular scale 11 in determining the number of twists to the inch on the helically grooved member 19. This means comprises a vertically arranged finger portion 25 which is slidably extended through a tubular member 26. The tubular member 26 is longitudinally slidably mounted in a slot 27 formed in the tube 16 adjacent to the linear scale 17. A spring 28 operates between a portion of the tubular member 26 and a flange 29 formed on the finger-like member 25 for urging the inner end of the finger member into a position in which it engages the groove of the helically grooved member 19. The engagement of the finger-like member with the helically grooved member 19 causes the follower to move along the linear scale 17 and clearly indicates that the follower has moved along one inch of the helically grooved member 19. The helically grooved member 19 is turned by turning the knob 12 to move the finger-like member 25 along the linear scale 17 while at the same time counting the rotations of the knob 12 which are required to move the follower one inch along the scale 17. If it requires ten turns of the knob 12 to move the follower one inch, it becomes evident that the helically grooved member 19, if a twisted member, is formed with ten twists to the inch. If the pitch of the twist of the helically grooved member 19 is such that a turn of less than a complete revolution moves the follower one inch on the linear scale 17, the movement of less than one complete revolution may be determined on the scale 11. Thus, if the knob requires merely a half turn to move the follower one inch, the helically grooved member 19 is provided with a one-half twist to each linear inch.

In Figs. 6 and 7 the thread gauge is illustrated, set up to measure the pitch of internal threads formed on a member 19' and is in the form of a length of pipe formed on the inside of one of its ends with threads 30. The device for measuring the internal threads 30 is characterized by an L-shaped member 31 of flexible metallic material slidably extended through a guide 32' formed on the free end of the tube 16. The helically grooved member 19' is engaged into position in the thread gauge in the same manner as the helically grooved member 19 in the previous form of the invention. The arm of the L-shaped member 31 which extends downwards across the open end of the tube 16 (as shown in Fig. 6) is provided with a pair of inwardly extended caliper arms 32 which are pivotally supported upon lugs 33 formed on the downwardly extended arm of the L-shaped member. An expansion spring 34 operates between the adjacent faces of the caliper arms 32 for spreading them to cause both outwardly directed end portions 35 to engage in the threads 30. The arm of the L-shaped member 31, to which the caliper arms 32 are pivotally attached, is provided with a scale 36 graduated to indicate the distance which the caliper arms 32 are spread when inserted into the helically grooved member 19' to give the inside diameter thereof.

The other arm of the L-shaped member 31 is swivelly connected to a catch member 37. This swivel connection is accomplished by the provision of a headed pin 38 upon the free end of the arm of the L-shaped member 31 which is located in position within an extension 39 formed on the catch member 37. The flexibility of the arm 31 permits the free end of the arm to be raised to engage the catch member 37 over the top end of the finger-like portion 25 of the longitudinal follower mounted on the tube 16. The topmost flange of the tube-like member 26 which supports the finger-like portion 25 is provided with a pair of oppositely disposed upwardly extended pins 40 which pass through complementary openings formed in diametrically opposite sides of the catch member 37 for securely mounting the catch member 37 upon the tube-like member 26. This engagement between the catch-like member 37 and the tube-like member 26 will cause the finger-like portion 25 to mimic all movement of the L-shaped arm 31 as influenced by the pitch of the threads 30 on the interior of the helically grooved member 19'.

When the device is set up as illustrated in Figure 6, rotations of the knob 12 will cause the helically grooved member 19' to be rotated relative to the tube 16 and cause the L-shaped member 31 to be moved longitudinally of the tube 16 as the caliper arms 32 move axially due to the threads 30 with which they are engaged. This movement of the L-shaped arm 31 will also move the finger-like portion 25 similarly along the face of the linear scale 17. This movement of the follower on the linear scale 17 will permit the operator to determine the number of threads to the inch merely by counting the rotations of the knob 12 which are required to move the finger-like portion 25 the required one inch across the face of the linear scale 17.

As shown in Fig. 1 the catch-like member 37 may be disengaged from the finger-like portion 25 permitting the caliper arms 32 to be turned into an inoperative position extended above tube 16 merely by twisting the L-shaped arm 31 about the pivot 38. A metallic band 40 is adapted to be engaged about the free end of the caliper arms 32 when those arms are in an inoperative position to retain the arms against being spread to either maximum operative position under the influence of the expansion spring 34.

When measuring external threads or the twist of wire the finger-like portion 25 is used independently of the caliper arms 32 which are moved to their inoperative position. When it is desired to determine a number of threads to the inch on an internally threaded object, the device is set up as shown in Fig. 6 and the movement of the finger-like portion 25 will be influenced by the caliper arms 32 which engage the internal threads of the controlling member 19' while the inner end of the finger-like portion 25 merely moves across the other periphery of the helically grooved member 19'. This movement of the finger-like portion 25 will be directly influenced by the caliper arms 32.

In Fig. 8 the caliper arms 32' are formed with inwardly extending end portions 35', adapted to engage in the external threads 30'. In other respects this form of the invention is similar to that previously shown and like reference numerals identify like parts in each of the several views.

It is to be understood that the turns of any screw or helicoid may be determined by means of this device.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A thread gauge, comprising a collar having an angular scale, a knob cooperative with said scale and axially rotatively mounted in said collar, a tube provided with a linear scale and removably rotatably mounted axially of and on said collar, means connected with said knob for holding a helically grooved member axially through said tube, and a follower for said linear scale and longitudinally slidably mounted on said tube for engaging the groove of said helically grooved member, said knob being rotatively supported by the engagement of pins from said collar with peripheral grooves formed on said knob, said removable mounting of said tube comprising bayonet slots formed on one end of said tube and engaging with the projected ends of said pins.

2. A thread gauge, comprising a collar having an angular scale, a knob cooperative with said scale and axially rotatively mounted in said collar, a tube provided with a linear scale and removably rotatably mounted axially of and on said collar, means connected with said knob for holding a helically grooved member axially through said tube, and a follower for said linear scale and longitudinally slidably mounted on said tube for engaging the groove of said helically grooved member, said knob being rotatively supported by the engagement of a pin from said collar with a peripheral groove formed on said knob, said removable mounting of said tube comprising a bayonet slot formed on one end of said tube and engaging with the projected end of said pin.

STEVEN PANTAGES.